UNITED STATES PATENT OFFICE 2,452,092

RUBBERLIKE PRODUCT AND PROCESS OF PREPARATION

Waldo C. Ault, Philadelphia, and Benjamin B. Schaeffer, Upper Darby, Pa., assignors to the United States of America as represented by the Secretary of Agriculture No Drawing. Application October 10, 1944,
Serial No. 558,068

7 Claims. (Cl. 260—399)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes wtihout the payment to us of any royalty thereon.

This invention relates to the preparation of polymeric substances and novel rubber-like materials, and is directed more particularly to a method of producing rubber-like materials from hydroxy fatty acids and to the products obtained thereby.

One object of the invention is to provide new materials in the form of high molecular weight polymers which are especially adapted for use as bases for rubber-like substances.

Another object is to produce a rubber-like material which will be very stable and resistant to oxidation.

Further objects will appear from the following description.

It is known that polyesters may be obtained by subjecting organic hydroxy acids to auto-esterification or condensation. However, in the case of unsaturated hydroxy acids, it has usually been supposed that conditions necessary for auto-esterification would produce dehydration. We have found that if such dehydration does take place, it is so slight as not to interfere with the auto-esterification reaction.

We have discovered that by auto-esterification or condensation of hydroxy acids, if a portion or all of the hydroxy acid is unsaturated, i. e., contains one or more double bonds, the resulting product can be vulcanized with sulfur, selenium and other known vulcanizing and compounding agents to give rubber-like materials. Moreover, by varying the proportions of saturated and unsaturated hydroxy acid components, it is possible to control the amount of unsaturation in such a manner as to give a product which can be satisfactorily vulcanized but which at the same time contains only such a slight excess amount of unsaturation that it is very stable and is not deteriorated by contact with air, oxygen, ozone or other oxidizing substances.

In general, the materials which may be used in carrying out our invention can be described as follows. The saturated component should correspond to the formula:

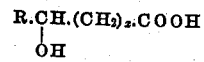

where R is an alkyl group, and $x$ is a positive integer not less than 5.

And the unsaturated component should correspond to the formula:

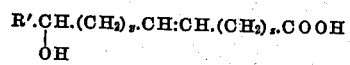

where R' is an alkyl group, $y$ is a positive integer, and $z$ is a positive integer not less than 5.

A specific example of a suitable raw material for use according to this invention is a mixture of a substantially pure hydroxystearic acid with a substantially pure ricinoleic acid. A satisfactory hydroxystearic acid, the 12-hydroxystearic acid, may be obtained by the hydrogenation of ricinoleic acid which can be obtained from castor oil. However, because of the difficulty of preparing 12-hydroxystearic acid in a form sufficiently pure for our purpose, we usually prefer to use the hydrostearic acids which are obtained by sulfation of oleic acid with sulfuric acid and subsequent hydrolysis of the sulfated acid. The acid prepared in this manner is a mixture consisting chiefly of 10-hydroxystearic acid, and probably some 9-hydroxystearic acid. A product very satisfactory for our purpose is readily and easily obtained by one crystallization of the crude hydrolysis product from a cheap solvent such as gasoline, kerosene, petroleum naphtha or acetone. The 10-hydroxystearic acid and 9-hydroxystearic acid which are the chief products of sulfation and subsequent hydrolysis of oleic acid may be designated by the following respective formulas:

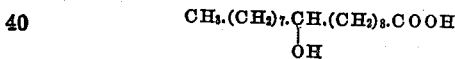

10-hydroxystearic acid

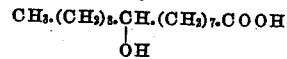

9-hydroxystearic acid

The mixture of saturated hydroxystearic acids containing the above-designated isomeric forms will hereafter be referred to simply as monohydroxystearic acid.

As a source of the unsaturated hydroxy acid, we prefer to use ricinoleic acid which is an important constituent of castor oil and which contains one double bond as well as an hydroxyl group. Its formula is:

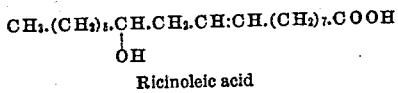

Ricinoleic acid

It is desirable that the ricinoleic acid be of a relatively high degree of purity. It may be satisfactorily prepared by saponification of castor oil followed by acidification to give castor oil acids. Suitable ricinoleic acid is then obtained by low temperature fractional crystallization from acetone.

These hydroxy acids both saturated and unsaturated must be handled with some care to avoid splitting out water with the formation of a double bond which might reduce their value in a reaction of our preferred type. However, we have found that in certain cases it may be desirable toward the close of the reaction period to raise the temperature and purposely induce dehydration. This will serve to introduce a double bond near the end of the long molecule which then may be joined during the vulcanization procedure to another long molecule, which has been dehydrated in a similar manner, giving a very desirable effect in the properties of the finished product.

As catalysts, we prefer to use very small amounts of alkaline substances such as alkali, alkaline earth oxides or the alkali or alkaline earth salts of organic acids. We have found an amount of calcium oxide up to 0.1% to be very effective although amounts up to 1% or more may be used with very good results. Likewise, similar amounts of calcium acid malate may be used.

The temperature at which auto-esterification or condensation of the mixture of saturated and unsaturated hydroxy acids may occur most advantageously will usually be between 170° C. and 210° C., although temperatures as low as 150° C. or as high as 250° C. may often prove desirable. The time of heating may be from a few hours up to several hundred hours and may be varied according to the specific nature of the reactants and the particular properties of the condensate.

Since water is evolved in the auto-esterification or condensation of these hydroxy acids, the use of a vacuum proves advantageous. However, the condensation may be effected at atmospheric or even at superatmospheric pressures, especially if a dry inert gas such as nitrogen, carbon dioxide, hydrogen or the like is passed continuously through the reaction mixture. Vigorous stirring of the reaction mixture has also been found advantageous in the production of high molecular weight polymers having desirable properties for making rubber-like materials.

In the preparation of polyesters containing substantial amounts of monohydroxy acids, we have found that within limits it is very desirable to have no appreciable amounts of substances present which are not capable of undergoing the reaction to form polyesters. The presence of even small amounts of such substances as stearic or oleic acids or other similar compounds which are monofunctional under our reaction conditions is undesirable, since they are capable of reacting to enter into the chain, but because of their single functionality are then incapable of further reaction and hence immediately stop any further increase of the molecular size at that point.

After the condensation of the hydroxy acids has been carried to the desired point, as may be determined by means of a cryoscopic molecular weight determination, viscosity measurement, and carboxyl group titration or other suitable analytical means, the resulting polymer is ready for the vulcanization treatment. We have found that a molecular weight of at least 3000 or higher as determined by suitable procedures such as are given above is desirable at this stage. The polymer is converted to a rubber-like material by mixing it with sulfur, selenium and other known vulcanizing and compounding agents and then curing for various periods of time from 15 minutes to several hours at elevated temperatures. Suitable temperatures are 135°–160° C., although temperatures as low as 90° C. or as high as 200° C. may prove advantageous under certain conditions. Various amounts of compounding materials such as are frequently added to rubber may be added to the polymer before vulcanization. The compounding agents may include such substances as carbon black, zinc oxide, fatty acids, resins, oils or other softeners, as well as vulcanization accelerators, activators, promoters and ultra accelerators. Under certain conditions, it may prove advantageous to mix the sulfur and such other of the compounding ingredients as is desirable, and then subject the whole mass to a precuring treatment for a period of time such as 5 minutes up to several hours at an elevated temperature which may vary from 90° C. to 200° C. Following this precuring treatment, the balance of the desired compounding ingredients may be worked in by suitable means such as one of the conventional types of mixers and mills. Then the material is ready for final vulcanization treatment.

Our invention is illustrated by the following examples describing some of its embodiments:

*Example I*

72 parts by weight of monohydroxystearic acid obtained by sulfation of oleic acid, 8 parts of purified ricinoleic acid and 0.08 part of calcium oxide were placed in a small flash and heated at 177°–184° C. for 169 hours. The mixture was stirred during the entire period and a rapid current of nitrogen was passed through it to aid in the removal of volatile products such as water vapor. The molecular weight of the polymer after this treatment was 7945 as determined by titration of the free carboxyl group with standard alkali. The iodine number was 10.4.

This polymer was converted to a rubber-like material by mixing 10 parts by weight with 4 parts of carbon black, 0.1 part of sulfur, 0.4 part of zinc oxide and 0.42 part of mercaptobenzothiazole. It was precured for ½ hour at 150° C. producing a rubbery substance, which was milled and molded into several test samples by treatment for 2, 3, 5, and 7 hours at 150° C. The sample molded at 150° C. for 2 hours was strong and flexible and was the best product from the standpoint of rubber-like properties.

*Example II*

126 parts by weight of monohydroxystearic acid, 14 parts of purified ricinoleic acid and 0.14 part of calcium oxide were heat treated in an atmosphere of nitrogen as described in Example I. A temperature of 176–183° C. was employed for a period of 250 hours. A polymer was obtained having a molecular weight of 9905 determined by end carboxyl group titration. The iodine number was 10.84. 20 parts by weight of this polymer were mixed with 8 parts of carbon black, 0.3 part of mercaptobenzothiazole, 0.1 part of zinc dimethyldithiocarbamate, 1 part of zinc oxide, 0.4 part of sulfur and 0.2 part of stearic acid, and the resulting compound precured for 1 hour at 150° C. A rubber-like material resulted which was milled and molded into several test samples by treatment for 2, 3, 5, and 7 hours at 150° C. The best sample was the one which was subjected to mold conditions for 2 hours.

Example III 72 parts by weight of monohydroxystearic acid, 8 parts of ricinoleic acid and 0.08 part of calcium oxide were heated at 176°–185° C. with stirring in an atmosphere of nitrogen for a period of 86 hours. This treatment produced a polymer with a molecular weight of 3613 and having an iodine number of 13.5.

The viscous polymer thus obtained was converted to a rubber-like material by mixing with compounding agents exactly as described in Example II. It was precured for ¾ hour at 140° C., giving a tough, rubber-like substance which was milled and molded into several test samples.

Example IV 88 parts by weight of monohydroxystearic acid, 22 parts of purified ricinoleic acid and 0.11 part of calcium oxide were heated at 177°–184° C. for 173 hours in an atmosphere of nitrogen as described in Example I. The polymer produced by this treatment had a molecular weight of 8045 and an iodine number of 20.5.

The viscous polymer thus obtained was converted to a rubber-like material by mixing with compounding agents as described in Example II. It was precured for ½ hour at 140° C., producing a tough, rubbery substance which was milled and molded into several test samples. A 3 hour cure at 140° C. gave the best product from the standpoint of elasticity and tensile strength.

Example V 75 parts of monohydroxystearic acid and 0.1 part of calcium acid malate were heated at 174°–183° C. with stirring in an atmosphere of nitrogen for a period of 256 hours. This treatment bave a polymer having a molecular weight of 9810 as determined by end group titration. Its iodine number was 3.18.

This polymer was mixed with compounding agents and heated to 140° C. producing a very tacky, plastic material which gave no evidence of having undergone vulcanization. The product was noticeably inferior to the rubber-like substances described in the foregoing examples wherein unsaturated hydroxy acid was present.

Having thus described our invention, we claim:

1. The process of preparing polymers which comprises auto-esterifying a mixture of substantially pure monohydroxystearic acid and a substantial amount of substantially pure ricinoleic acid.

2. The process of perparing polymers which comprises auto-esterifying a mixture of substantially pure monohydroxystearic acid and a substantial amount of substantially pure ricinoleic acid in the presence of a catalyst selected from the group consisting of alkali, alkaline earth oxides, and alkali and alkaline earth salts of organic acids.

3. The process of preparing polymers which comprises auto-esterifying a mixture of substantially pure monohydroxystearic acid and a substantial amount of substantially pure ricinoleic acid in the presence of a catalyst selected from the group consisting of alkali, alkaline earth oxides, and alkali and alkaline earth salts of organic acids at a temperature of about 150° to 250° C. until a molecular weight of at least 3000 is obtained.

4. A condensation product of a mixture of substantially pure monohydroxystearic acid and a substantial amount of substantially pure ricinoleic acid.

5. The process of preparing rubber-like products which comprises vulcanizing the polymers produced by the process of claim 1.

6. The process of preparing rubber-like products which comprises vulcanizing the polymers produced by the process of claim 2.

7. The process of preparing rubber-like products which comprises vulcanizing the polymers produced by the process of claim 3.

WALDO C. AULT.
BENJAMIN B. SCHAEFFER.

REFERENCES CITED

The following references are of record in the file of this patent:

UNITED STATES PATENTS

| Number | Name | Date |
|---|---|---|
| 1,484,826 | Zollinger et al. | Feb. 26, 1924 |
| 1,936,831 | Del-Turco | Nov. 28, 1933 |
| 2,156,737 | Priester | May 2, 1939 |
| 2,256,353 | Rheineck | Sept. 16, 1941 |